United States Patent [19]

Igarashi et al.

[11] Patent Number: 5,186,044

[45] Date of Patent: Feb. 16, 1993

[54] AIR FLOW RATE MEASURING DEVICE FOR AN INTERNAL COMBUSTION ENGINE

[75] Inventors: Shinya Igarashi; Kaoru Uchiyama, both of Katsuta, Japan

[73] Assignees: Hitachi, Ltd., Tokyo; Hitachi Automotive Engineering Co., Ltd., Ibaraki, both of Japan

[21] Appl. No.: 649,859

[22] Filed: Feb. 1, 1991

[30] Foreign Application Priority Data

Feb. 7, 1990 [JP] Japan .................................. 2-026058
Mar. 7, 1990 [JP] Japan .................................. 2-053692

[51] Int. Cl.$^5$ ............................................... G01F 1/68
[52] U.S. Cl. .................................. 73/118.2; 73/204.22
[58] Field of Search .............. 73/118.2, 204.21, 204.22

[56] References Cited

U.S. PATENT DOCUMENTS 4,785,662  11/1988  Ohta et al. ...................... 73/118.2 X
4,887,577  12/1989  Arai et al. ....................... 73/118.2 X

FOREIGN PATENT DOCUMENTS 0295647  12/1988  European Pat. Off. .
0313089   4/1989  European Pat. Off. .

*Primary Examiner*—Jerry W. Myracle
*Attorney, Agent, or Firm*—Ladas & Parry

[57] ABSTRACT

An air flow rate measuring device for an internal combustion engine has a housing adapted to be inserted through a wall, the housing defining an air intake main passage of the engine. The housing also has an auxiliary air passage for a portion of the intake air and the housing supports a circuit board containing a hot wire and a temperature sensitive resistor, the hot wire being adapted to measure the air flow rate in the auxiliary passage. In a feature of the invention the housing has a metallic wall which is exposed to air flow in the main passage so that improved temperature reliability of the device may be achieved.

17 Claims, 4 Drawing Sheets

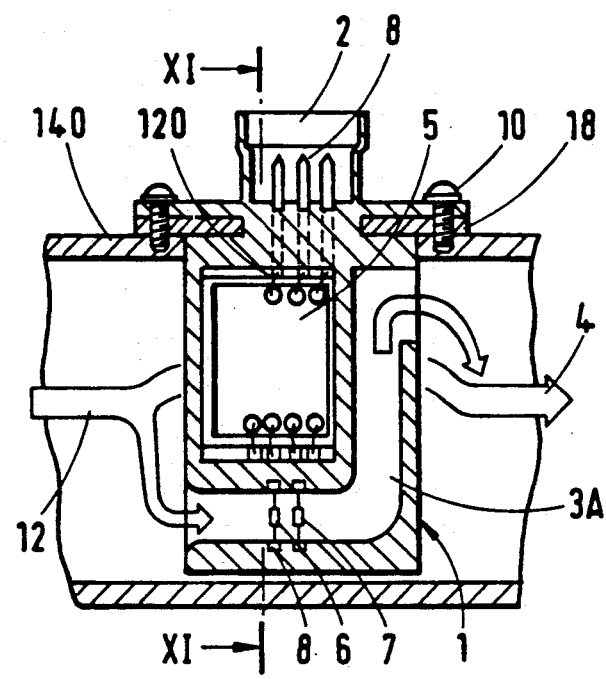
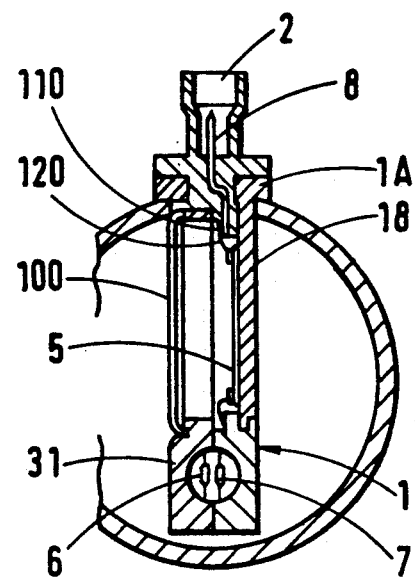
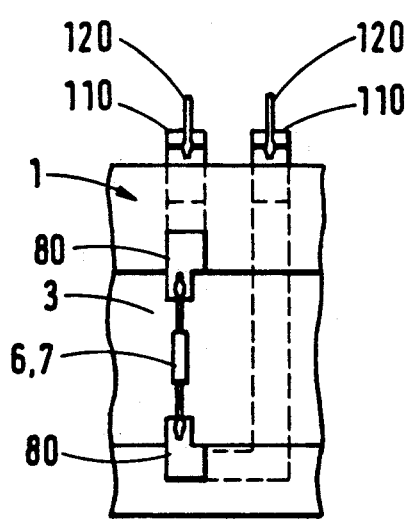
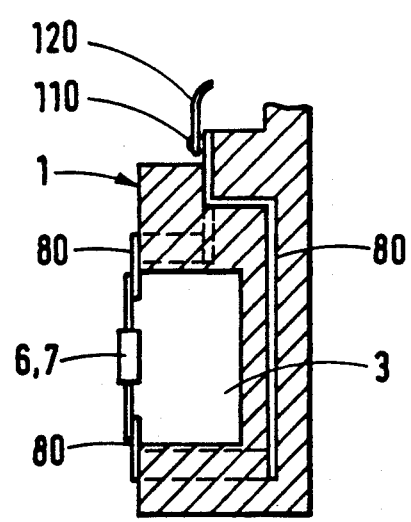
Fig.10
Fig.11
Fig.12
Fig.13

AIR FLOW RATE MEASURING DEVICE FOR AN INTERNAL COMBUSTION ENGINE

BACKGROUND OF THE INVENTION (a) Field of the Invention

This invention relates to an air flow rate measuring device for an internal combustion engine and in particular, although not exclusively, to a thermal type of air flow meter.

(b) Description of Related Art

A known thermal type air flow meter such as a so-called hot-wire air flow sensor is disclosed in Japanese Patent Application Laid Open No. 58-109817 (1983). The sensor disclosed therein has a metallic, cast, body defining a circularly cross-sectioned air intake main passage and a bypass, auxiliary air flow passage in which is located a hot wire and a temperature sensitive, compensating, resistor. The hot wire and the temperature sensitive resistor components are both connected to a circuit module adapted to drive these components and to process signals therefrom, the circuit module being located externally of the body. Also, as disclosed in Japanese Patent Application Laid Open No. 59-31412 (1984), it is known to locate the hot wire and the temperature sensitive resistor in an insulating molded housing for the circuit module.

Because, in the prior art, the construction is such that the circuit module protrudes outside from the intake air passage, there are problems such as difficulty in obtaining a convenient layout for the inside of the engine compartment, and there is also susceptibility to breakage of the circuit module.

It is an object of this invention to reduce the size and cost of an air flow rate measuring device. In a feature of this invention it is an object to provide improved thermal stability of the device.

SUMMARY OF THE INVENTION

According to this invention there is provided an air flow rate measuring device for an internal combustion engine including a housing adapted to be inserted through wall means defining an air intake main passage of said engine, said housing having an auxiliary air passage for a portion of the intake air, and said housing supporting a circuit means for measuring the air flow rate in said auxiliary passage.

Preferably, the circuit means includes a thermal sensor for measuring said air flow rate and a circuit module adapted to drive said thermal sensor and to process signals therefrom.

In one preferred embodiment, the auxiliary air passage includes at least one curved portion extending between an inlet port and a down stream outlet port, whereby said outlet port is arranged to be radially offset from set inlet port with respect to said main passage.

In said one preferred embodiment, said inlet and outlet ports face in the axial direction of said air intake passage.

Advantageously, said inlet port faces in the axial direction of said air intake passage and said outlet port faces transversely across said air intake passage.

Preferably, the inlet to said auxiliary air passage is dish-shaped to extend across the axis of said air intake passage with a downstream exit from said inlet leading to an outlet of said auxiliary air passage, said exit being one of radially offset from the main passage axis and on said main passage axis.

Advantageously, air rectifying means are positioned over said auxiliary air passage inlet.

In a preferred feature of this invention the housing comprises a metallic wall means and an insulating body integrally molded to one another, said auxiliary air passage being formed in said body, whereby said metallic wall means is adapted to be exposed to air flow in said main passage.

Preferably, said thermal sensor is located across said auxiliary air passage in said body and said circuit module is secured to said metallic wall means.

Advantageously, said housing is integrally connected to a flange means for supporting said housing in said main air passage.

Preferably, said flange means is adapted to be located externally of the main passage and said main air passage may be one of an air inlet upstream from a branched manifold or in a respective branch of a branched manifold.

In a preferred manner of construction, the body is formed in two halves, one half being adjacent the metallic wall means and forming a partial enclosure about the circuit module and one half of the auxiliary air passage, and the second half forming the remaining enclosure about the circuit module and the second half of the auxiliary air passage.

Advantageously, the second half has an aperture through which the circuit module may be adjusted and a cover means is provided for said aperture.

In a further preferred embodiment an inlet port of said auxiliary air passage is elongated for serial location of a hot wire sensor and a temperature sensor thereacross.

In said further preferred embodiment the auxiliary air passage downstream from said hot wire sensor and temperature sensor is divided into two flow paths which unite at an exit port of said auxiliary air passage from said housing.

Preferably, connector means external of said housing are provided for electrical connection to said circuit means.

Conveniently, said metallic wall means is one of L and T-shaped for connection to said flange means.

By the use of such a construction, because the housing for the circuit module forms the auxiliary passage within the intake air passage, the layout arrangement for the inside of the engine compartment is easier to arrange, and the risk of breaking the circuit module is considerably reduced. Also, because a wall of the housing is metallic and may be secured to a metallic main air flow passage defining means, so improved thermal stability is afforded.

BRIEF DESCRIPTION OF THE DRAWINGS

The invention will now be described, by way of example, with reference to the accompanying drawings in which:

FIG. 10 shows a longitudinal cross-sectional view of a third embodiment of this invention installed in an engine intake air passage, FIG. 11 shows a cross-sectional view along double arrow-headed lines XI—XI of FIG. 10, FIG. 12 shows the mounting part of a hot wire and a temperature sensitive resistor used in the present invention, FIG. 13 shows a cross-sectional side view of FIG.

In the Figures like reference numerals denote like parts.

DESCRIPTION OF THE PREFERRED EMBODIMENTS

Figure 1:
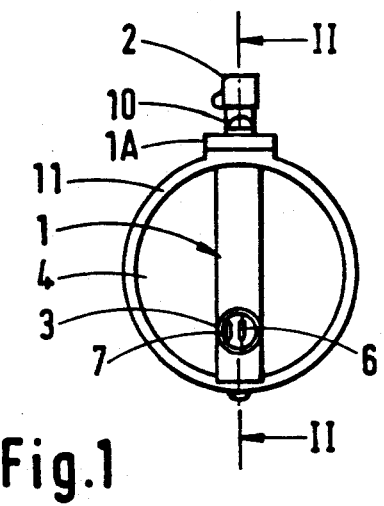
FIG. 1 shows an end view from the upstream direction of the duct of one embodiment of an air flow rate measuring device in accordance with the present invention.
Figure 2:
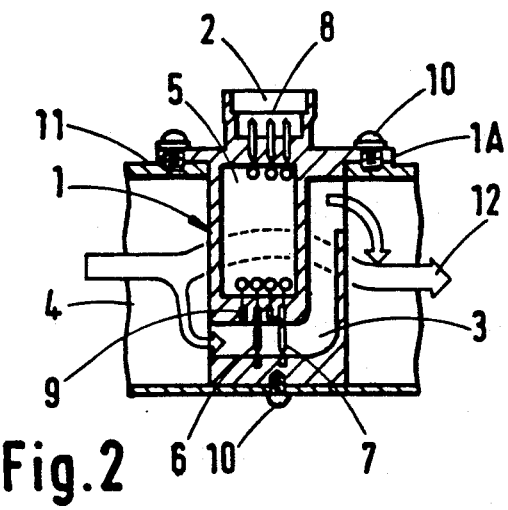
FIG. 2 shows a cross-section along double arrow-headed line II—II of FIG. I.

The thermal air flow meter shown in FIGS. 1 and 2 is installed through an aperture in a wall of a circularly cross-sectioned body 11 which constitutes a main air passage 4 and the meter has a module housing 1 diametrically extending across the passage 4 to rest in an axially extending groove in the lower (as shown in FIG. 1) internal surface of the main passage 1. The housing 1 has a flange portion IA by which the housing is secured to the body 11 by a screw 10. In the housing 1 is an auxiliary air passage 3 located on a printed circuit board 5. In the auxiliary air passage 3 are a transversely arranged hot wire 6 and a temperature sensitive resistor 7. Also on the circuit board 5 is a circuit which heats the hot wire 6 and processes signals from the temperature sensitive resistor 7, but the circuit on board 5 may also have numerous other functions. Terminals 8, 9 are provided for external connections to the circuit board 5. In this embodiment, as an example, the auxiliary air passage has a circular cross-section, and the passage has an L-shape with an inlet radially offset from the axis of the main passage, and the exit of the auxiliary air passage is downstream and radially offset from the auxiliary air passage inlet and the main passage axis. A connector 2 is integrally formed with the module housing 1 and is positioned on the outside of the body 11.

The body 11 is arranged so that the entire flow of the engine intake air (which flows as shown by arrow-headed lines 12) will pass through the main air passage 4 of the body II, which body is adapted to be located within the intake air line of the internal combustion engine, the hot wire 6 detects the entire engine intake air flow from the air which is bypassed to the auxiliary air passage 3. Both ends of the body 11 are cylindrically shaped for facilitating mounting to an engine air inlet, but any convenient shape may be employed.

Therefore, the air which has passed through a conventionally provided air cleaner (not shown) that is taken into the internal combustion engine flows through the main air passage 4 of the body 11, but part of the air flows through the auxiliary air passage 3, and said part of the air flow is measured by the hot wire 6.

Because the module housing 1 is cooled by the intake air, countermeasures for thermal influence are simplified.

Figure 3:
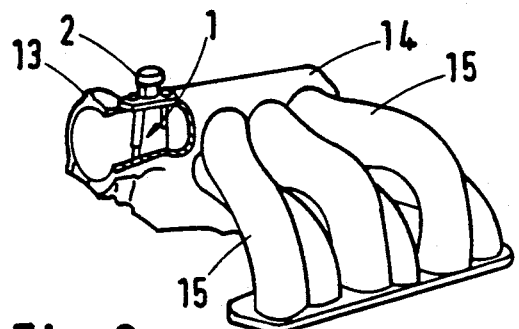
FIG. 3 shows in partial section a second embodiment of an air flow rate measuring device in accordance with this invention when installed on an air intake manifold.
Figure 4:
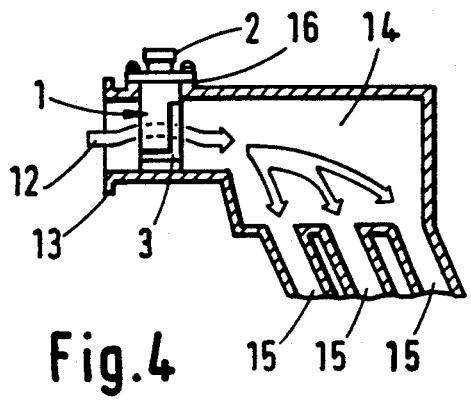
FIG. 4 is a longitudinal cross-sectioned view of the embodiment shown in FIG. 3, invention under construction.

FIG. 3 and FIG. 4 show a second embodiment where a part of the already installed intake air line is used as the main air passage, thereby avoiding the use of a separate body 11.

The module housing 1 is inserted through an aperture in the intake air line wall provided near the entry 13 of the intake manifold, and is secured thereto by the connector 2 abutting a flanged, upwardly extending mounting port 16. Intake air 12 which flows into the intake manifold is flow detected at the module housing 1 in the main air passage. The intake air is divided by branches 15 from link 14 to each cylinder and is then sucked to the engine combustion chamber.

Figure 5:
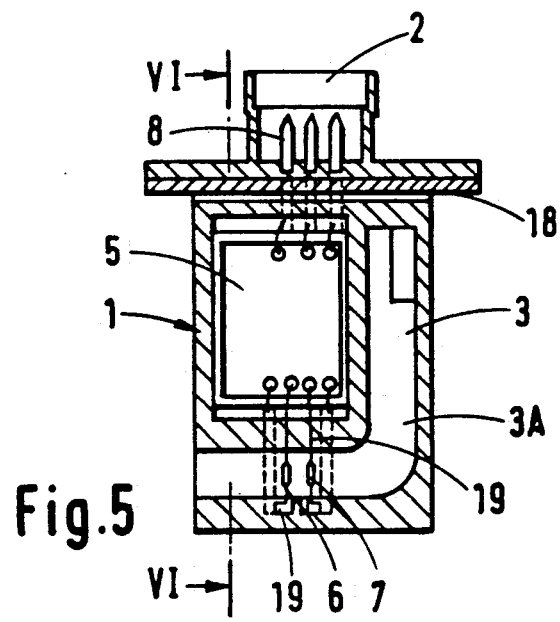
Figure 6:
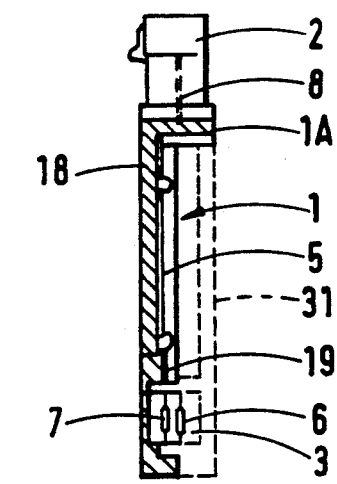
FIG. 6 shows a cross-section along double arrow-headed lines VI—VI of FIG. 5, FIG. 7 schematically shows fuel control for respective engine cylinders using this invention.

The module housing 1 will now be described with reference to FIGS. 5 and 6. A metallic base 18 is formed in an L-shape, and serves as a base which accommodates the circuit board 5, the base being attachable to the main air passage by flange 1A. The base 18, the terminal 8 and a lead frame 19 are integrally secured in a plastics or synthetic resin molding to form the module housing 1. In the molding are formed the auxiliary air passage 3 and the connector 2 along with the enclosure for installing the circuit board. The space formed between the entrance of the auxiliary air passage and the curved part 3A of the L-shaped passage locates the circuit board 5. The hot wire 6 and temperature sensitive resistor 7 are connected to a lead frame 19, and the thus formed assembly is connected to the terminal 8 and the circuit board 5. A mold 31 (shown in a broken line in FIG. 6), forming a half section of the auxiliary air passage 3, is formed and bonded, for example by thermal welding, to the housing 1, and the auxiliary air passage is thus completed, and the flow rate versus output characteristic of the meter is adjusted. A small window having a removable cover (both not shown) is provided in the mold 31, the cover being removable for laser trimming of an adjusting resistor on the circuit board 5. In this embodiment, the cross-section form of the auxiliary air passage is a rectangular form, and the exit from the auxiliary air passage is a transversely extending slot through the housing, the entrance and exit of the auxiliary air passage being offset from one another on opposite sides of the main passage axis.

Therefore, when this module housing 1 is provided in the main air passage 4, the construction is such that the heat of the circuit board 5 is taken away from the metallic base 18 by the air flow, thereby enhancing temperature stability of the device.

Figure 7:
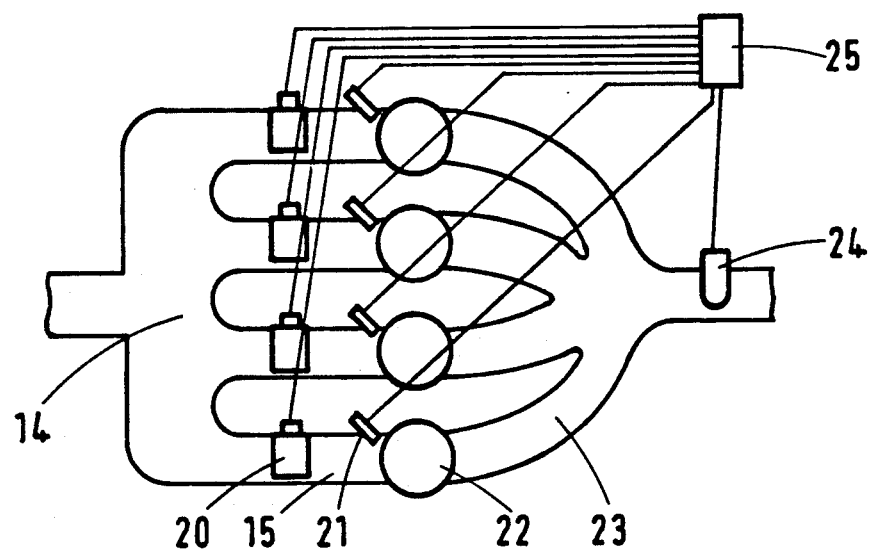

FIG. 7 shows an engine system which performs fuel control for each cylinder using the intake air measuring apparatus of the present invention. To each intake manifold branch 15 which branches from a link 14 of the intake manifold, a hot wire type air flow meter 20 shown in FIG. 5 and FIG. 6 is installed and the air flow rate which is sucked by each cylinder is detected, and the fuel injected by injectors 21 corresponding to that amount of air is controlled according to the particular cylinder requirements. The amount of injected fuel is feedback controlled depending on whether the exhaust gas detected by an $O_2$ sensor 24 after burning in the combustion chamber 22, is rich or lean. At this moment, by reading in the output of the $O_2$ sensor in synchronism with the exhaust timing of each cylinder, feedback control for the respective cylinders, or learning control for the respective cylinders is performed by a control unit 25.

Figure 8:
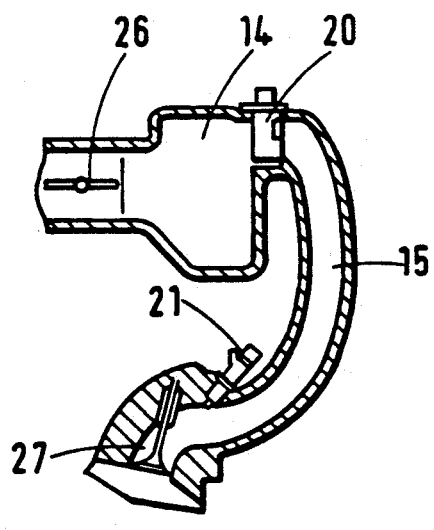
FIG. 8 shows a cross-sectional view of the intake manifold shown in FIG. 7 in which a device in accordance with this invention is installed.
Figure 9:
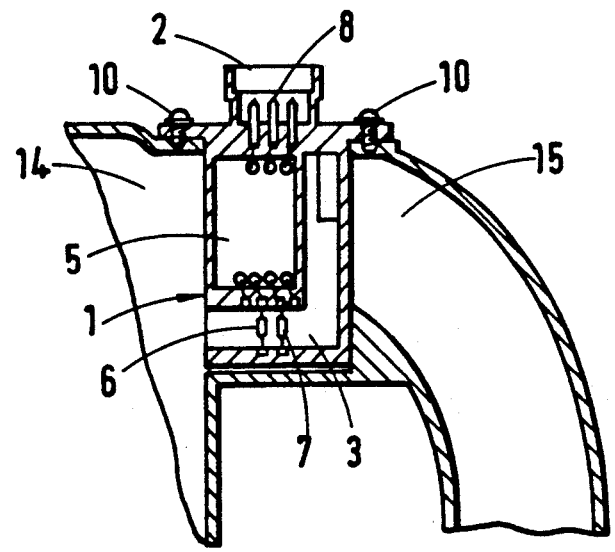
FIG. 9 shows a detailed cross-sectional view of FIG. 8.

FIGS. 8 and 9 show the device installed in each intake manifold branch 15 as shown in FIG. 7.

The intake air which is flow controlled by a throttle valve 26 is distributed to the intake manifold branch 15 which extends to each cylinder from the link 14 of the intake manifold, and after mixing with the fuel at the injector 21, is introduced through an air intake valve 27 into the combustion chamber. The hot wire air flow meter 20 is installed from the top of the branching point between from the link 14 of the intake manifold to the intake manifold branch 15. Although the drawing shows only one hot wire type air flow meter and one intake manifold runner for the sake of convenience, there is actually an air flow meter in correspondence with the number of cylinders.

As shown in FIG. 9, the inlet of the auxiliary air passage 3 of the hot wire air flow meter is parallel with the wall surface of the link 14 of the intake manifold, and the module housing 1 is inserted so that the outlet part of the auxiliary air passage is within the intake manifold branch 15. The module is located in a groove in the internal surface of the intake air passage and secured with the screws 10. The installation of the module to each intake manifold branch is possible in this embodiment even though the diameter of the intake manifold branch 15 is less than the length of the inserted part of the module housing.

FIG. 10 and 11 show a third embodiment of the present invention, when attached to an engine intake air passage 140 which is larger than the above described intake air passages. Thus, the housing 1 is not located in a groove in the internal surface of the intake passage and in this embodiment the base 18 is formed with a T-shaped flange 1A for location on the wall of the air intake passage.

As before, the metallic base 18, the plastics module housing 1 and plastics connector 2 are integrally secured together. When forming the integral molding, the connector terminal 8 and a lead frame 80 (shown in FIG. 12) are also anchored in the plastics mold. The connector parts are thus completed but the housing is in a condition where only the wall which surrounds the perimeter of the ceramic electronic circuit board 5 and half of the auxiliary air passage 3 are formed. Next, the electronic circuit board 5 is secured by bonding to the metallic base 1, and a welding pad 110 on the circuit side of the connector terminal 8 is connected to the electronic circuit 5 by a conductive line 120. Referring now also to FIGS. 12 and 13, after securing the hot wire 6 and the temperature sensitive resistor 7 to the lead frame 80 by spot welding so that they are arranged within the auxiliary air passage 3, the welding pad 110 (shown in FIG. 12) is formed at the circuit side terminal of the lead frame 80, and the electronic circuit 5 is connected thereto by the conducting line 120. After the operation of assembly and connection is completed, a second part of the auxiliary air passage 3 formed by plastics mold 31 is bonded to the module housing 1 and the auxiliary air passage 3 having a circular cross-section in FIGS. 10, 11 is completed. In this condition, the electronic circuit 5 is adjusted so that the characteristic of air flow rate versus output is modified by actually letting air flow into the auxiliary air passage, and after operations such as gel injection over the circuit for protection and for keeping out moisture, are completed, a cover 100 is bonded to the housing 1.

In the present invention, because the intake air passage 3 is formed in two halves, complicated auxiliary air passage forms, such as L-shaped and square cross-section passages, may be formed.

The FIGS. 12 and 13 show the assembly of the hot wire 6 and temperature sensitive resistor 7 in greater detail. FIG. 12 shows the mounting portion of the hot wire 6 or temperature sensitive resistor 7 on the half of the auxiliary air passage 3 which is formed during formation of the module housing 1, and FIG. 13 shows a cross-section perpendicular to FIG. 12. In FIGS. 12, 13 the cross-sectional shape of the auxiliary air passage is shown as a square. As explained above, the lead frame 80 is connected and anchored by the plastic molding which forms the module housing 1, and all the parts within the plastic molding except for the mounting part of the hot wire and the temperature sensitive resistor and the conductive welding pad. The frame 80 for mounting the hot wire and/or the temperature sensitive resistor is positioned on opposing side walls of the auxiliary air passage 3, and the hot wire 6 and the temperature sensitive resistor 7 are connected across the auxiliary air passage 3. In this embodiment the connection of both the hot wire 6 and the temperature sensitive resistor 7 to the lead frame 80 is by spot welding.

The form of the lead frame and the pattern of the electronic circuit 5, the mounting position of the hot wire 6 and the temperature sensitive resistor 7 may be different from that described above, for example, it is possible to place the hot wire 6 near the entrance of the auxiliary air passage, and the temperature sensitive resistor 7 near the auxiliary air passage exit.

Figure 14:
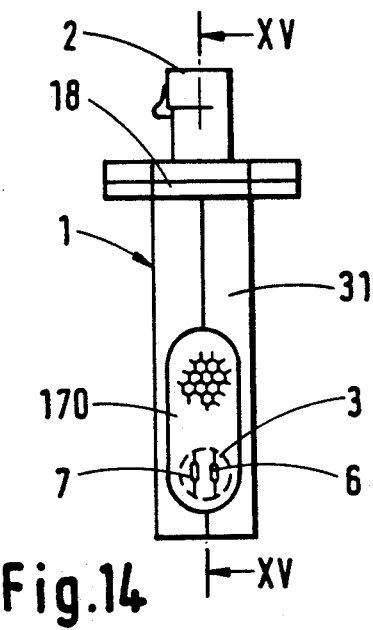
FIG. 14 shows a side view of a fourth embodiment of the present invention having a dished inlet port for the auxiliary air passage.
Figure 15:
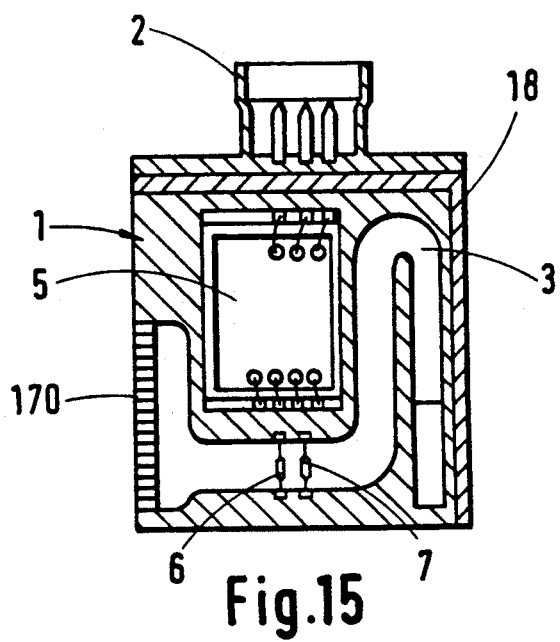
FIG. 15 is a cross-section along double arrow-headed lines X-XV of FIG. 14.

In the embodiment shown in FIGS. 14 and 15, the entry form of the auxiliary air passage 3 is a dished ellipse extending over the axial center of the main passage defining means 14 or 140. Such an arrangement is advantageous where the meter is to be located near an upstream bend in an air intake manifold since the air volume may be distorted near the passage side walls but the distortion is normally less at the passage longitudinal axis. Thus, by arranging the auxiliary inlet to extend over the main passage center line a more accurate detection of the air flow is achieved.

Further, in the embodiment of FIGS. 14, 15 at the entrance of the auxiliary air passage a rectifying grid 170, such as a honeycomb or a mesh, is mounted for reducing air turbulence. Because the air flow which flows into the auxiliary air passage has air turbulence which is substantially eliminated by the grid 170, so the output noise of the hot wire type air flow meter is reduced.

Also, in the embodiment of FIGS. 14, 15 the auxiliary air passage 3 is bent in an inverted U-shape making the entire length of the auxiliary air passage long. By such an expedient, pulsing of the air flow caused by the engine can be reduced so that the air pulsating effect on the hot wire air flow meter is reduced, thereby increasing the accuracy of the meter.

In FIG. 15, the exit of the auxiliary air passage is in a plane perpendicular to the main air passage, i.e. transverse to the main passage. By this expedient it is not easy for blow back from the engine, such as a backfire, to invade within the auxiliary air passage, thereby the accuracy and reliability of the hot wire type air flow meter is improved.

Also in the embodiment of FIGS. 14, 15, the metallic base 18 is formed so that it covers the surface of the plastic molding perpendicular to the direction of the air flow on the downstream side. This surface is preferably metal since it directly receives high temperature shock flow caused by combustion/misfire whereby the reliability of the hot wire air flow meter is improved.

Figure 16:
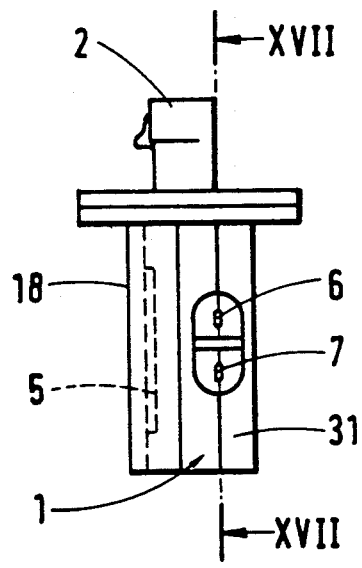
FIG. 16 shows a side view of a fifth embodiment of the present invention in which particular attention has been directed to miniaturization.
Figure 17:
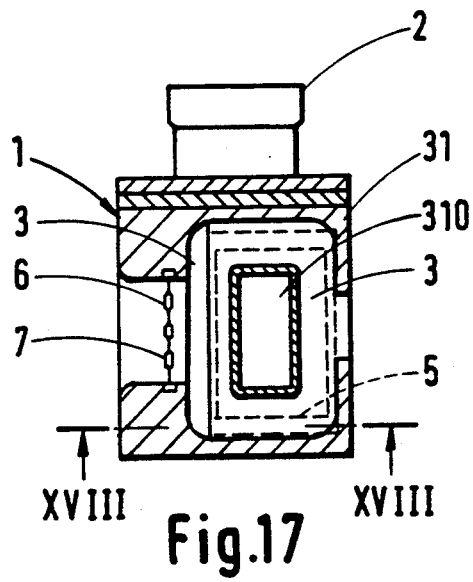
FIGS. 17 and 18 show cross-sectional views along double arrow-headed lines XVII—XVII and XVIII-—XVIII respectively of FIG. 16.
Figure 18:
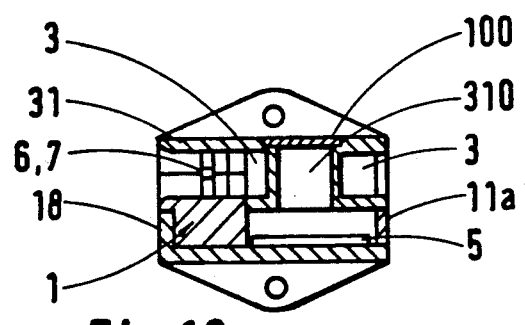

FIGS. 16-18 show an embodiment which permits miniaturization and height reduction of the housing 1 in order to install the meter in an air passage which has a limited passage area, such as an intake manifold branch. In the embodiments of FIGS. 16-18, the module housing 1 is formed by a plastic molding which forms a half-section of the upstream part of the auxiliary air passage from the entrance of the auxiliary air passage 3 to the mounting part of the hot wire 6 and the temperature sensitive resistor 7 on the metallic base 18, and rear wall exit portion 11a and provides space for installment and connection of the electronic circuit 5. After the installment and connection of the electronic circuit 5, and the installation of the hot wire 6 and the heat sensitive resistor 7, a bypass mold 31 which forms the other half-section of the upstream part and most of the downstream auxiliary air passage is formed. The auxiliary air passage 3 in the bypass mold 31 is formed by the inner wall of the module housing 1 and a recess in the bypass mold 31, the central part 310 of the bypass mold 31 being hollow. The mold 31 has a window (shown in FIG. 18 covered by a metal or plastics cover 100 so that the electronic circuit can be seen for adjusting the characteristic of air flow rate versus output by modifying components on the circuit board. Because the inlet of the auxiliary air passage 3 is enlarged in an oval cross-section form, so both the hot wire 6 and the temperature sensitive resistor 7 may be arranged serially adjacent one another across the inlet, and it is also possible to shorten the entire axial length of the meter housing. After the adjustment of the electronic circuit is terminated, the gel injection is carried out and the cover 100 is connected to complete the assembly. In FIGS. 16-18, the metallic base 18 is formed to cover approximately a half the upstream side of the meter surface perpendicular to the air flow in the main air passage so as to improve the heat transfer between the metallic base and the air flow, and thereby increase the hot wire air flow meter reliability.

In the present invention, because the circuit module and the auxiliary air passage are formed within a housing capable of being inserted and installed within the intake air passage, there is no need to find extra space within the engine compartment for a specifically provided metal body forming both main and auxiliary passages and in which the circuit module protrudes therefrom, so the layout within the engine room is easier to organize. Also by preferably providing the circuit module with a metal wall base which can be mounted in the main passage air stream, so improved temperature reliability of the device can be achieved.

Although the invention has been described in relation to a hot wire air flow rate meter it is to be understood that the invention also has applicability to a Karman Vortex air flow sensor in which a vortex producing means is provided in an auxiliary air flow passage for producing air turbulence indicative of air flow amount and means are provided for determining the air turbulence, which determining means may be an ultrasonic device producing an output frequency indicating the turbulence.

It is to be understood that the invention has been described with reference to exemplary embodiments, and modifications may be made without departing from the spirit and scope of the invention as defined in the appended claims.

We claim:

1. An air flow rate measuring device for an internal combustion engine including a housing adapted to be inserted through wall means defining an air intake main passage of said engine, said housing having an auxiliary air passage for a portion of the intake air, said housing supporting a thermal sensor for detecting the air flow rate in said auxiliary passage, said housing including a wall means located in said main passage to be cooled by intake air, and a circuit module mounted on said wall means for driving said thermal sensor and to process signals therefrom.

2. A device as claimed in claim 1 wherein the auxiliary air passage includes at least one curved portion extending between an inlet port and a down stream outlet port, whereby said outlet port is arranged to be radially offset from set inlet port with respect to said main passage.

3. A device as claimed in claim 2 wherein said inlet and outlet ports face in the axial direction of said air intake passage.

4. A device as claimed in claim 2 wherein said inlet port faces in the axial direction of said air intake passage and said outlet port faces transversely across said air intake passage.

5. A device as claimed in claim 1 wherein the inlet to said auxiliary air passage is dish-shaped to extend across the axis of said air intake passage with a downstream exit from said inlet leading to an outlet of said auxiliary air passage, said exit being radially offset from the main passage axis or on said main passage axis.

6. A device as claimed in claim 5 wherein air rectifying means are positioned over said auxiliary air passage inlet.

7. A device as claimed in claim 1 wherein an inlet port of said auxiliary air passage is elongated for serial location of a hot wire sensor and a temperature sensor thereacross.

8. A device as claimed in claim 7 wherein the auxiliary air passage downstream from said hot wire sensor and temperature sensor is divided into two flow paths which unite at an exit port of said auxiliary air passage from said housing.

9. A device as claimed in claim 1 wherein connector means external of said housing are provided for electrical connection to said circuit means.

10. A device as claimed in claim 1 wherein said wall means is a metallic wall means and the housing comprises said metallic wall means and an insulating body integrally molded to one another, said auxiliary air passage being formed in said body, whereby said metallic wall means is adapted to be exposed to air flow in said main passage.

11. A device as claimed in claim 10 wherein said thermal sensor is located across said auxiliary air passage in said body and said circuit module is secured to said metallic wall means.

12. A device as claimed in claim 11 wherein said housing is integrally connected to a flange means for supporting said housing in said main air passage.

13. A device as claimed in claim 12 wherein said flange means is adapted to be located externally of the main passage and said main air passage may be one of an air inlet upstream from a branched manifold or in a respective branch f a branched manifold.

14. A device as claimed in claim 12 wherein said metallic wall means is one of L and T-shaped for connection to said flange means.

15. A device as claimed in claim 10 wherein the body is formed in two halves, one half being adjacent the metallic wall means and forming a partial enclosure about the circuit module and one half of the auxiliary air passage, and the second half forming the remaining enclosure about the circuit module and the second half of the auxiliary air passage.

16. A device as claimed in claim 15 wherein the second half has an aperture through which the circuit module may be adjusted and a cover means is provided for said 17. An air flow rate measuring device for an internal combustion engine including a housing adapted to be inserted through wall means defining an air intake main passage of said engine, said housing having an auxiliary air passage for a portion of the intake air, said housing supporting a thermal sensor for detecting the air flow rate in said passage, said housing including a wall means located in said main air passage to be cooled by intake air, a circuit module mounted on said wall means for driving said thermal sensor and to process signals therefrom, said wall means being a metallic wall means and said housing comprising said metallic wall means and an insulating body integrally molded to one another, said auxiliary air passage being formed in said body, whereby said metallic wall means is positioned to be exposed to air flow in said main passage.

* * * * *